United States Patent
Auclair

(12) 
(10) Patent No.: US 7,138,021 B2
(45) Date of Patent: Nov. 21, 2006

(54) SHAPING AND LAYING A TIRE BELT PLY

(75) Inventor: Jacques Auclair, Cournon-d'Auvergne (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 330 days.

(21) Appl. No.: 10/776,255

(22) Filed: Feb. 12, 2004

(65) Prior Publication Data

US 2005/0000626 A1    Jan. 6, 2005

(30) Foreign Application Priority Data

Feb. 13, 2003    (FR) .................................. 03 01863

(51) Int. Cl.
   *B29D 30/30* (2006.01)
(52) U.S. Cl. .................. 156/64; 156/123; 156/133; 156/134; 156/406.4
(58) Field of Classification Search ................ 156/123, 156/133, 134, 405.1, 406.4
See application file for complete search history.

(56) References Cited

U.S. PATENT DOCUMENTS

| | | | |
|---|---|---|---|
| 4,769,104 A | 9/1988 | Okuyama et al. | |
| 4,804,426 A | 2/1989 | Okuyama et al. | |
| 4,857,123 A | 8/1989 | Still et al. | |
| 5,092,946 A | 3/1992 | Okuyama et al. | |
| 5,720,837 A * | 2/1998 | Regterschot et al. | 156/123 |
| 5,904,788 A * | 5/1999 | Kitajima et al. | 156/64 |
| 5,935,377 A | 8/1999 | Sergel et al. | |
| 2003/0019725 A1 * | 1/2003 | Hoffmann | 198/571 |

FOREIGN PATENT DOCUMENTS

| | | |
|---|---|---|
| EP | 0 649 730 | 4/1995 |
| JP | 05084849 A * | 4/1993 |

* cited by examiner

Primary Examiner—Geoffrey L. Knable
(74) Attorney, Agent, or Firm—Buchanan Ingersoll & Rooney PC

(57) ABSTRACT

Method of laying a tire belt ply on a form, using one or two transporters each having gripping assemblies, for gripping and moving the gripping sectors situated at the two longitudinal ends of a belt ply. The front and rear edges are aligned, after having determined the angular geometry of the ply edges by means of a suitable device, by independently moving at least one gripping sector of each of the front and rear areas. This method makes it possible to align edges having high curvatures and to lay a belt ply on a curved form.

8 Claims, 8 Drawing Sheets

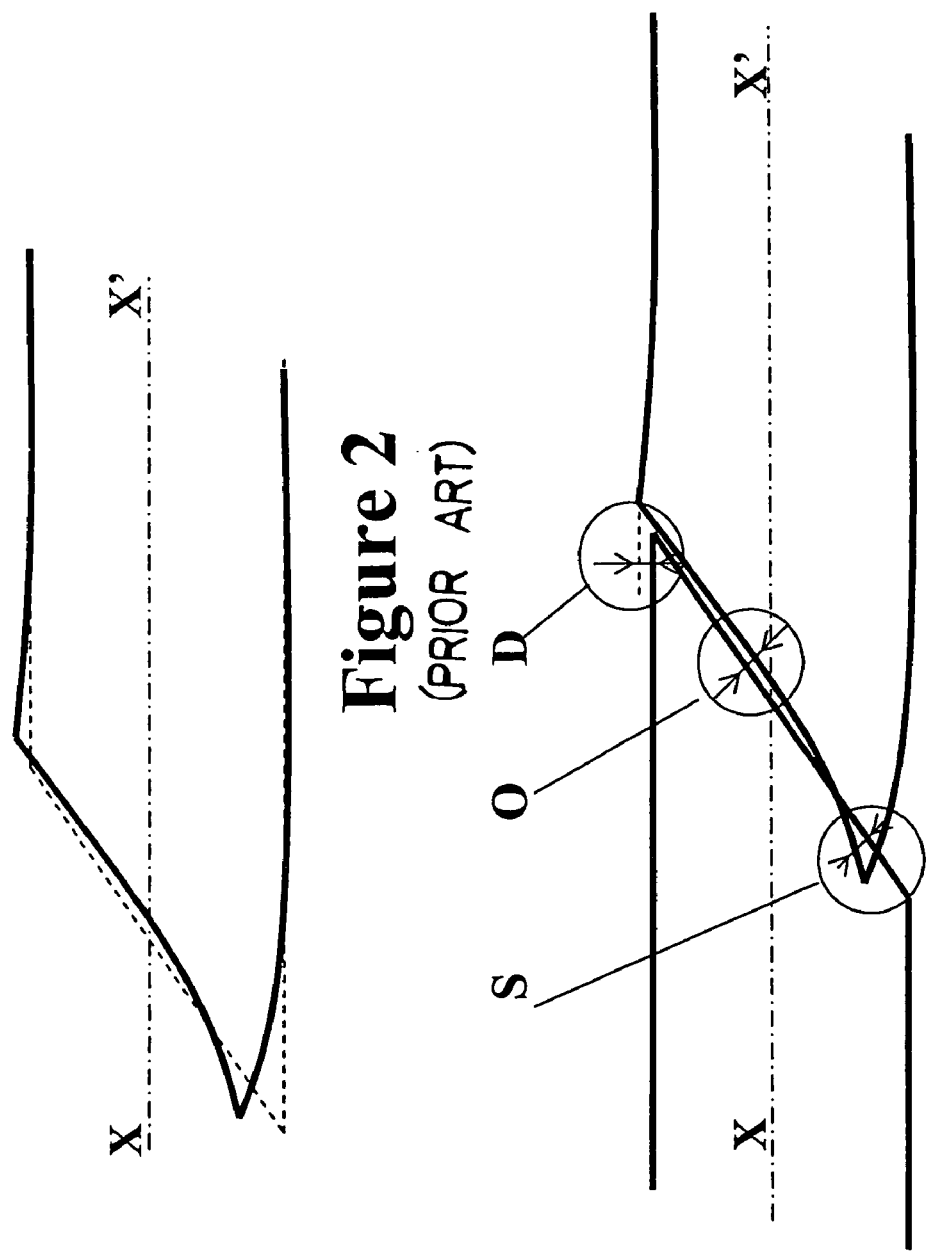

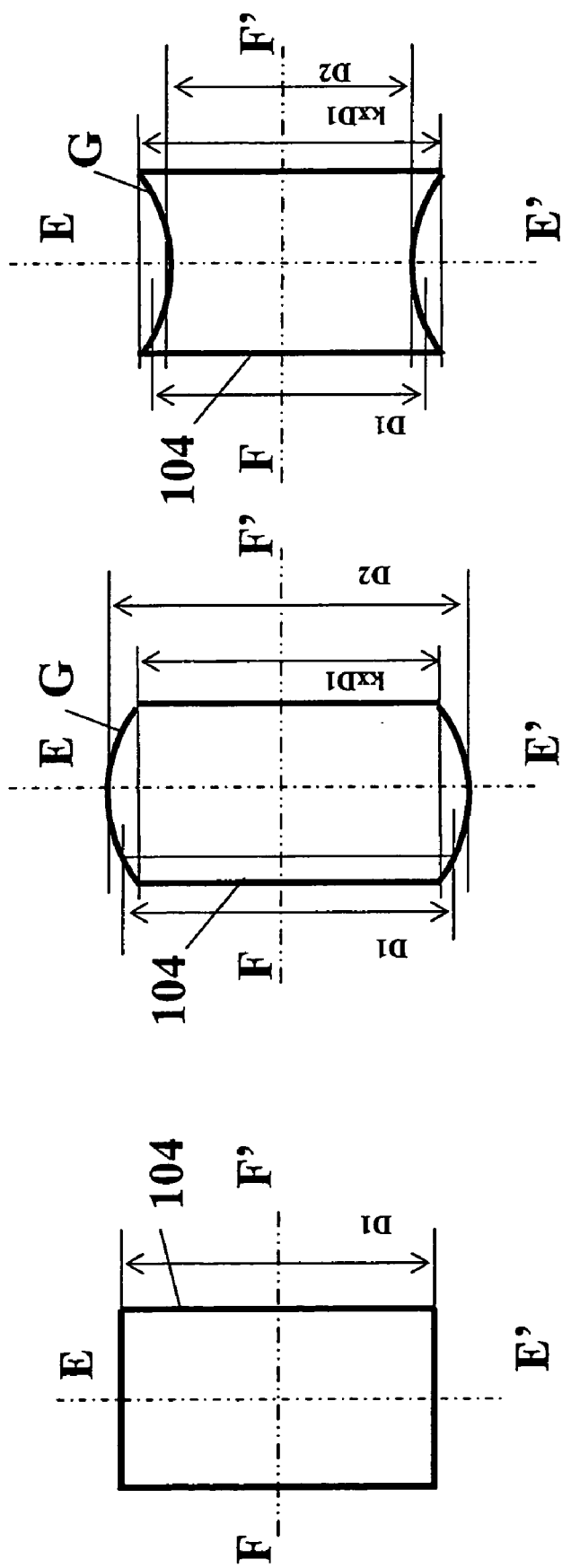

SHAPING AND LAYING A TIRE BELT PLY

This application claims priority under 35 U.S.C. §§ 119 and/or 365 to Patent Application Serial No. 0301863 filed in France on Feb. 13, 2003, the entire content of which is hereby incorporated by reference.

BACKGROUND OF THE INVENTION

The invention relates to a method, and an apparatus for implementing the method, for shaping and depositing a tire belt ply on a laying drum.

The manufacture of radial carcass tires makes it necessary to deposit, generally during the step of producing and assembling the uncured tire, a set of belts whose function is, amongst other things, to provide the clamping of the crown of the tire. These belt plies are formed from rectilinear cords, often metallic, coated in a rubber mixture, disposed parallel to each other and forming a given angle with the longitudinal direction of the ply.

The requirements of productivity and quality have for many years been leading tire manufacturers to seek a way for automating these laying operations. Thus the practice which consists of first depositing the belt plies on generally cylindrical laying forms and manually adjusting edge to edge the front and rear edges of the ply, and then gripping the crown belt thus produced by means for example of a transfer ferrule and bringing it onto an outer casing previously shaped in the form of a torus, has become widespread.

However, there remains a great difficulty in producing, without the intervention of a skilled operator, an edge to edge joining of the two ply ends with the precision compatible with the quality requirements of modern tires, avoiding superimpositions, offsets or openings.

Several prior art methods for automatically depositing the belt ply on a cylindrical form have been disclosed. These methods describe apparatus and methods whose aim is to control both the ply length, the angular geometry of the ply edge and the positioning of the ply at the time of laying.

Thus, Okuyama et al. U.S. Pat. No. 4,769,104 proposes a method comprising a set of movable arms for aligning and shaping the edge of a ply previously deposited on a magnetic belt. The necessarily rectilinear shape of the arms does not make it possible to correct curved ply edges. In addition, the successive action of the arms tends to modify the previously achieved alignment of the boundary at the time of the alignment of the edge, causing an offset at the bringing together of the two ends of the ply once deposited on the form.

Published EP 0 649 730 reports on a method in which the shape of the ply is analysed by cameras. By comparison with a predetermined theoretical shape, an automatic control system determines the transverse movements to be effected at the time of the deposition of the ply from an unwinding belt to a magnetic belt. This system nevertheless proves ineffective in precisely correcting the angular deviations of the ply edge with respect to a pre-established value.

U.S. Pat. No. 4,857,123 discloses a method in which the geometry of the ply edge is assessed by measuring the difference between the successive positions of a floating blade able to move in the direction perpendicular to the cutting edge, and a predetermined theoretical cutting line. The angular correction is made by a manipulator gripping the ply edge and effecting a controlled rotation about an axis perpendicular to the plane of the ply and passing substantially through the center of the edge, making the toe and heel of the ply undergo identical angular corrections.

U.S. Pat. No. 5,092,946 improves this last method by proposing depositing the ply on a succession of magnetic belts for holding the ply edge in position at each step of the laying cycle. These methods prove relatively effective for correcting rectilinear edges but do not make it possible to juxtapose two ply ends exhibiting a marked curvature of the edges edge-to-edge without causing superimposition, separation or opening.

It will be noted that the difficulties encountered during attempts at automation of the operation of juxtaposition of the edges of two ply ends relate to the very nature of the product, which has a high tendency to vary its length and/or the angle of the cords under the action of a transverse or longitudinal stress. In addition, the release of the stresses after the cutting has a tendency to deform the edge of the ply by curving the cords in a random manner particularly in the area of the toe. The ply is then said to stick-up.

OBJECTS AND SUMMARY OF INVENTION

The object of the present invention is to afford a simple solution to the problems posed for many years by mastering the great precision required for the shaping and deposition of a belt ply on a laying form.

The advantages of such a method have been revealed, in which the two longitudinal ends of the ply each comprise at least three gripping sectors, and characterised in that the alignment of the front and rear edges is effected by independently moving at least one gripping sector of each of the front and rear areas.

The gripping sectors of the front and rear areas are gripped by the same number of gripping assemblies disposed on a moving transporter, and at least one gripping assembly is equipped with a ply edge corrector for independently moving the corresponding gripping sector. It then becomes possible, after having determined the angular geometry of the ply edge by means of a suitable device, to align the angular orientations of the front edge and the rear edge with the required precision, even when the latter have high curvatures, and to attain and reproduce the quality standards required by modern tires for which no ply superimposition is tolerated, the openings between the two edges must not exceed the diameter of a cord and the offsets must be less than 3 mm.

BRIEF DESCRIPTION OF THE DRAWINGS

The detailed advantages and characteristics of such a method will appear from a reading of the present description and example embodiments of the method in accordance with the invention, with reference to the diagrams and drawings as follows:

FIG. 2 depicts a schematic view of a belt ply in the natural state compared with the theoretical geometric shape.

FIG. 3 depicts a schematic view of the form of the juxtaposition faults of two ply edges.

FIG. 6A is a sectional view taken along the line A—A in FIG. 6.

FIG. 9 depicts a schematic view of a laying form having a cylindrical profile.

FIG. 10 depicts a schematic view of a laying form having a convex curved profile.

FIG. 11 depicts a schematic view of a laying form having a concave curved profile.

DESCRIPTION OF A PREFERRED EMBODIMENT OF THE INVENTION

Hereinafter, the identical elements of the method depicted in FIGS. 1–11 will be designated by the same references numerals.

A belt ply consists of rectilinear cords of given length, generally metallic, coated in a rubber mixture and disposed parallel to each other forming a given angle α with the longitudinal direction of the ply.

Figure 1:
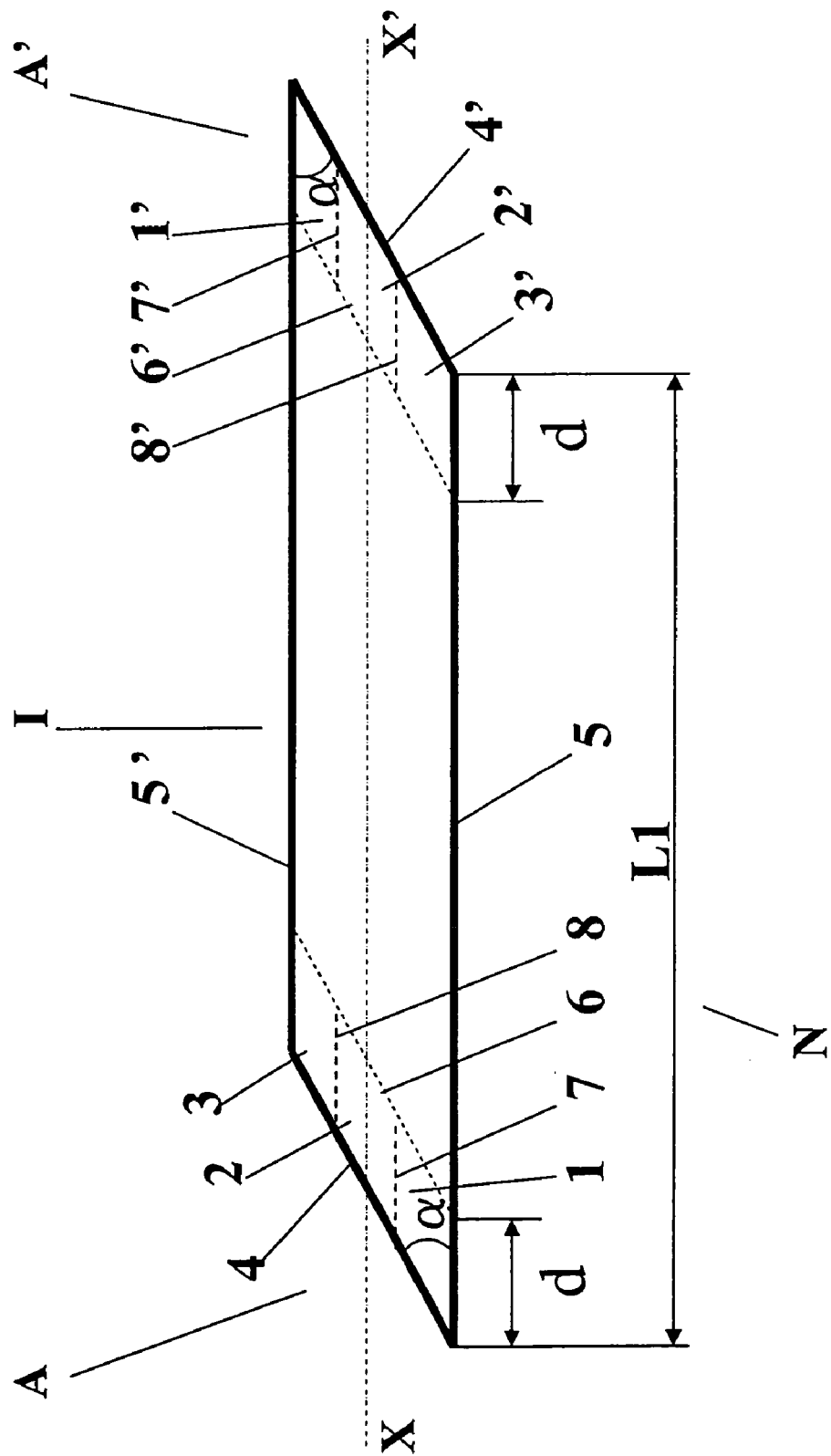
FIG. 1 describes the various areas of a belt ply.

According to the information indicated in FIG. 1, the belt ply (N) is bordered by two boundaries (5 and 5') and by the front and rear edges (4 and 4'). It comprises a longitudinal central axis XX' parallel to and substantially equidistant from the two boundaries (5 and 5').

The width of the ply is equal to the distance between the two boundaries. The ply is adjusted to a required length (L1). The front and rear edges form an angle (α) with the longitudinal direction of the ply. The angle (α) is generally between 15° and 65°.

At each of the two front and rear ends there are situated two transverse strips, in the form of a parallelogram, forming a front area (A) and a rear area (A'). Each of these areas is delimited by the ply edge, respectively (4 and 4'), an imaginary line, respectively (6 and 6') parallel to the ply edge and situated at a distance (d) from the ply edge, and by the boundaries (5 and 5'). The distance (d) is less than 10 cm. The intermediate area (l) consists of the length of ply lying between the front and rear areas.

Each of the areas, respectively front (A) and rear (A'), consists of at least three parts in the form of a parallelogram with approximately equal sizes and forming gripping sectors. Each of these sectors is delimited by imaginary longitudinal lines (7, 8, 7', 8'). The number of gripping sectors is determined by the nature and width of the ply to be laid and are shared between a sector bordering the boundary forming an angle (α) with the ply edge and called the toe (1, 1'), a certain number of intermediate sectors and a sector bordering the boundary forming an angle (π−α) with the edge and called the heel (3, 3'). FIG. 1 illustrates the case where each of the front and rear areas is divided into three gripping sectors forming the toe, respectively front and rear (1 and 1'), the central gripping sector, respectively front and rear (2 and 2') and the heel, respectively front and rear (3 and 3').

FIG. 2 depicts a front or rear area in the free state, that is to say when it is not held by any gripping system. There will be noted, in comparison with an ideal theoretical shape indicated in dotted lines, the deformation of the edge, which takes a curved shape, concave in the case illustrated, causing the transverse movement of the toe and heel.

Under these conditions, it will clearly be understood, as shown by FIG. 3, that such deformations are liable to introduce offsets (D), openings (O) or superimpositions (S) of the two front and rear edge lines at the time that they are juxtaposed end to end.

Figure 4:
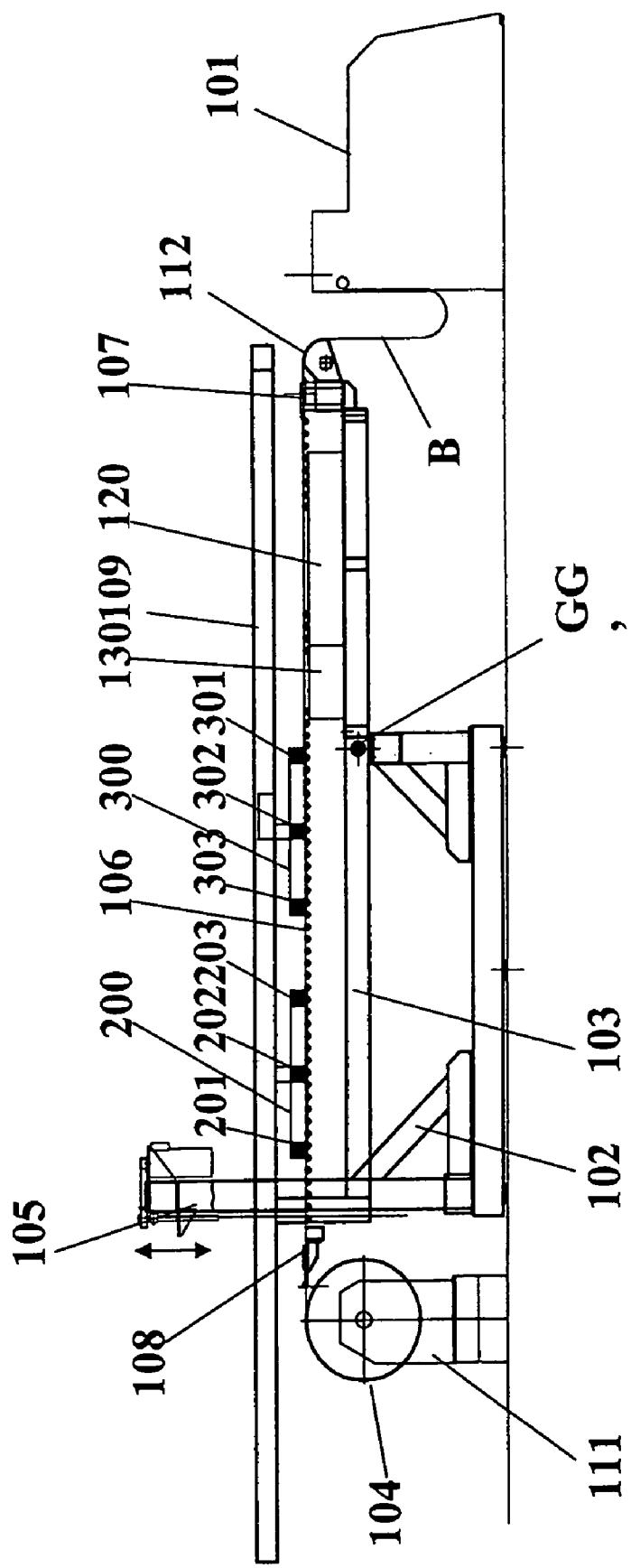
FIG. 4 depicts a general schematic side view of a machine in accordance with the method.
Figure 5:
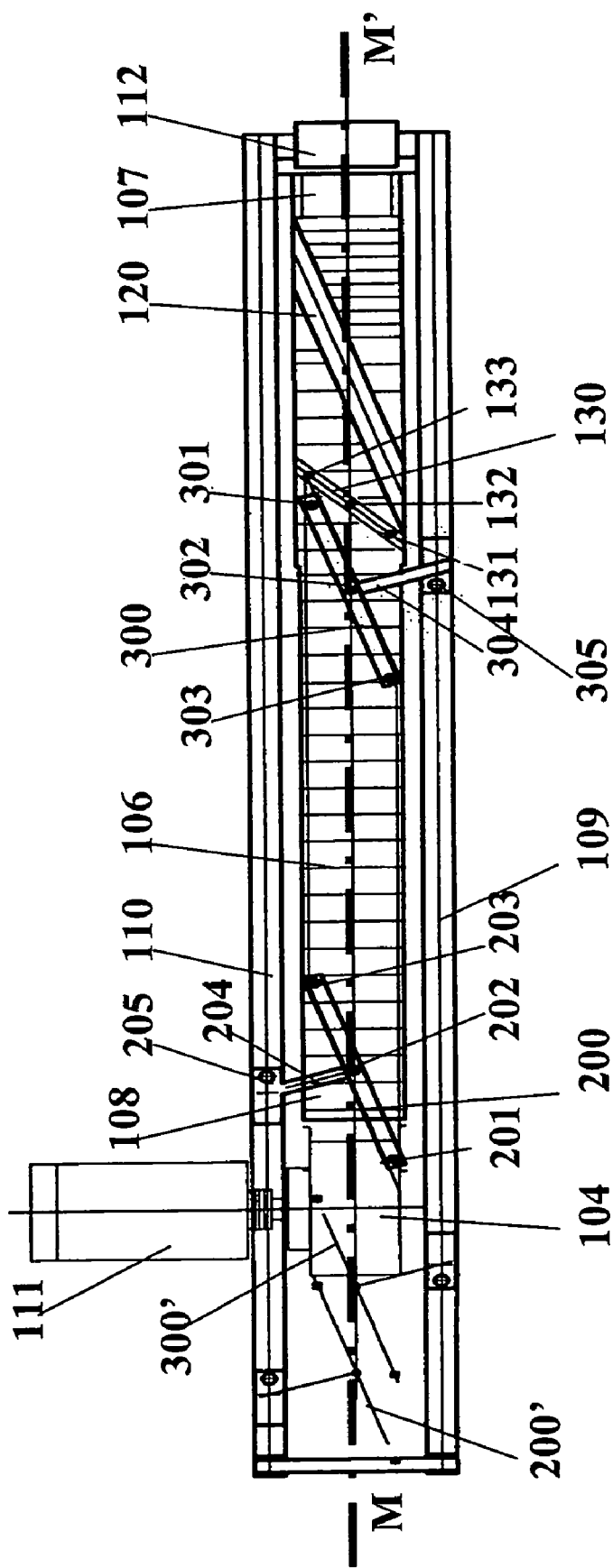
FIG. 5 depicts a general schematic plan view of a machine in accordance with the method.

FIG. 4 and FIG. 5 depict respectively a general side view and a general plan view of a machine implementing the method in accordance with the invention and adapted to the case where the front and rear areas of the ply are formed by three gripping sectors. This machine consists of a feed system (101) in which a continuous strip of belt (B) is placed, with a given width and angle. A fixed frame (102) supports a metallic chassis (103) on which there is mounted a roller conveyer (106) whose dimensions are adapted to the lengths and widths of belt plies to be handled. The conveyer is driven by a positioning motor (not shown) making it possible to unwind or advance in the longitudinal direction the strip or belt ply with a precise length determined for each sequence in the laying cycle.

A laying form (104), generally cylindrical as shown diagrammatically in FIG. 9, supported by a frame (111), is disposed downstream of the conveyer. The diameter D1 of the shape of the laying form is determined so that the circumference (π×D1) is adapted to the size of the tire to be produced. A mechanical locking system (not shown) makes it possible to align the axis of the machine (MM') with the equatorial plane (EE') of the laying form. The laying form is driven in rotation about an axis (FF') by a positioning motor (not shown) making it possible to coil a precise length of ply determined for each sequence in the laying cycle. The laying form comprises a magnetic or pneumatic device (not shown) intended to make the front and rear areas adhere to the surface of the form.

An elevator (105), actuated by an electric motor (not shown), raises or lowers the plane of the conveyer according to the diameter of the form, making the metallic chassis (103) perform a rotation about the axis (GG'), so as to make the plane of the conveyer approximately tangent with the laying form (104).

A precentering system (112) is disposed at the entry to the conveyer and aligns the longitudinal central axis (XX') of the strip or belt ply on the fixed longitudinal central axis of the machine (MM'). Autocentering systems (107 and 108) disposed at both ends of the conveyer make it possible to precisely guide the strip or belt ply in order to preserve its alignment and centering with respect to the machine axis throughout the implementation of the method.

A conventional orientable cutting assembly (120) with a floating blade (not shown) and as described for example in the publication U.S. Pat. No. 3,641,855 (incorporated by reference herein) or in the publication FR 1 220 265, is disposed at the head of the conveyer. The cutting assembly is oriented so as to form an edge oriented at an angle (α) with respect to the longitudinal axis of the conveyer. It makes it possible to make a cut between two cords of a continuous belt strip (B) without damaging the adjacent cords at the edge of the ply while tolerating an angular difference of the ply edge with respect to the theoretical angle (α). Once the strip is cut, a belt ply (N) is obtained with a given length (L1), ready to be placed in the current cycle of the process. Lateral clamps (not shown) placed close to the cutting edge make it possible to keep firmly in position during the cutting operation the rear area of the ply intended to be laid in the cycle during the process and the front area of the ply whose laying will correspond to a subsequent cycle in the process.

A fixed detection line (130) disposed under the plane of the ply is placed downstream of the cutting assembly. It consists of three optical detectors such as for example retro-reflecting laser cells reference LVH62 made by Keyence (131, 132 and 133) disposed along an axis forming an angle of approximately 45° with respect to the longitudinal axis of the conveyer. The central detector (132) is placed approximately at the intersection of the axis of the detection line and the machine axis (MM'). The two detectors placed at the two ends of the detection line (131 and 132) are disposed at equal distances from the machine axis so that they can be activated by the passage of the ply edge bordering respectively the toe and heel of the belt ply. The distance, in the transverse direction perpendicular to the machine axis, separating the end detectors is adjustable and predetermined according to the width of the ply. By way of indication it is approximately ten centimetres less than the width of the ply. Preferentially it will be chosen to dispose the two end detectors at a transverse distance less than the width of the ply by approximately 5 cm.

Front and rear transporters (200 and 300) supporting independent controllable gripping assemblies make it possible to grip the front area and the rear area. The number of gripping assemblies is determined by the number of gripping sectors dividing the front and rear areas and which is equal to three in the example proposed in the present description. Each of the transporters therefore comprises three gripping assemblies (201, 202 and 203) at the front (200), and three gripping assemblies (301, 302 and 303) at the rear (300), making it possible to grip respectively the front toe, central gripping sector and heel and the rear toe, central gripping sector and heel.

Each of the transporters, respectively front and rear, is connected by arms (204 and 304) to movable trains (205 and 305) moving in translation on longitudinal guide rails (109 and 110). These movable trains are equipped with positioning motors (not shown) for advancing the transporter by a precise length and determined for each sequence in the laying cycle. FIG. 5 shows schematically the extreme positions of the front (200') and rear (300') transporters when the rear toe is deposited on the form (104).

A central automatic actuation and control device (not shown) determines the instructions to drive the various components of the machine according to the laying cycle, set values, measured values and correction algorithms. It also, through an appropriate control of their respective positioning motors, synchronises the longitudinal advance of the conveyer, the longitudinal movements of the transporters and the circumferential movement of the laying form so as to avoid tensioning and unwanted deformation of the ply.

Figure 6:
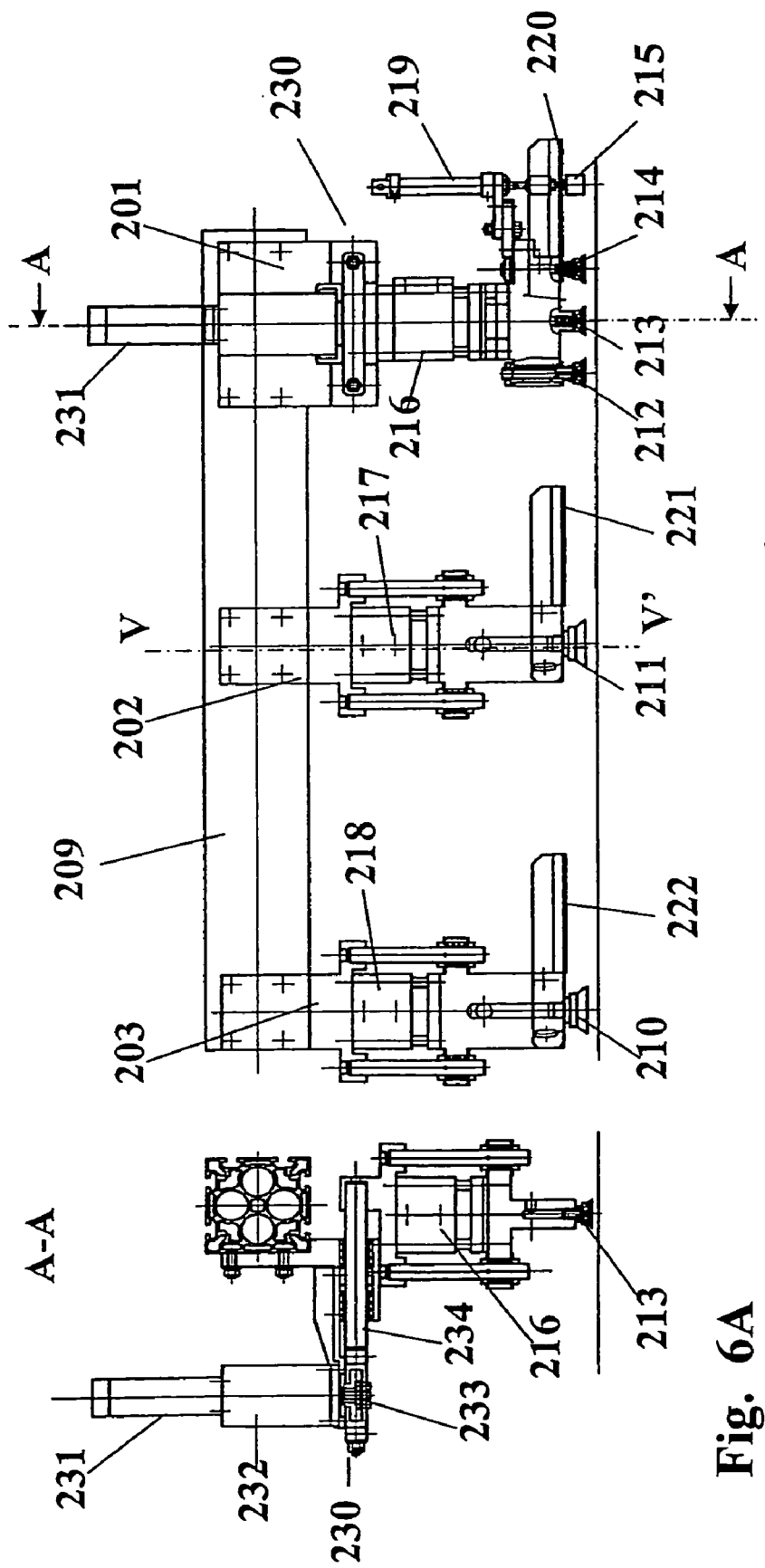
FIG. 6 depicts a general schematic front and side view of a front transporter according to the invention.
Figure 7:
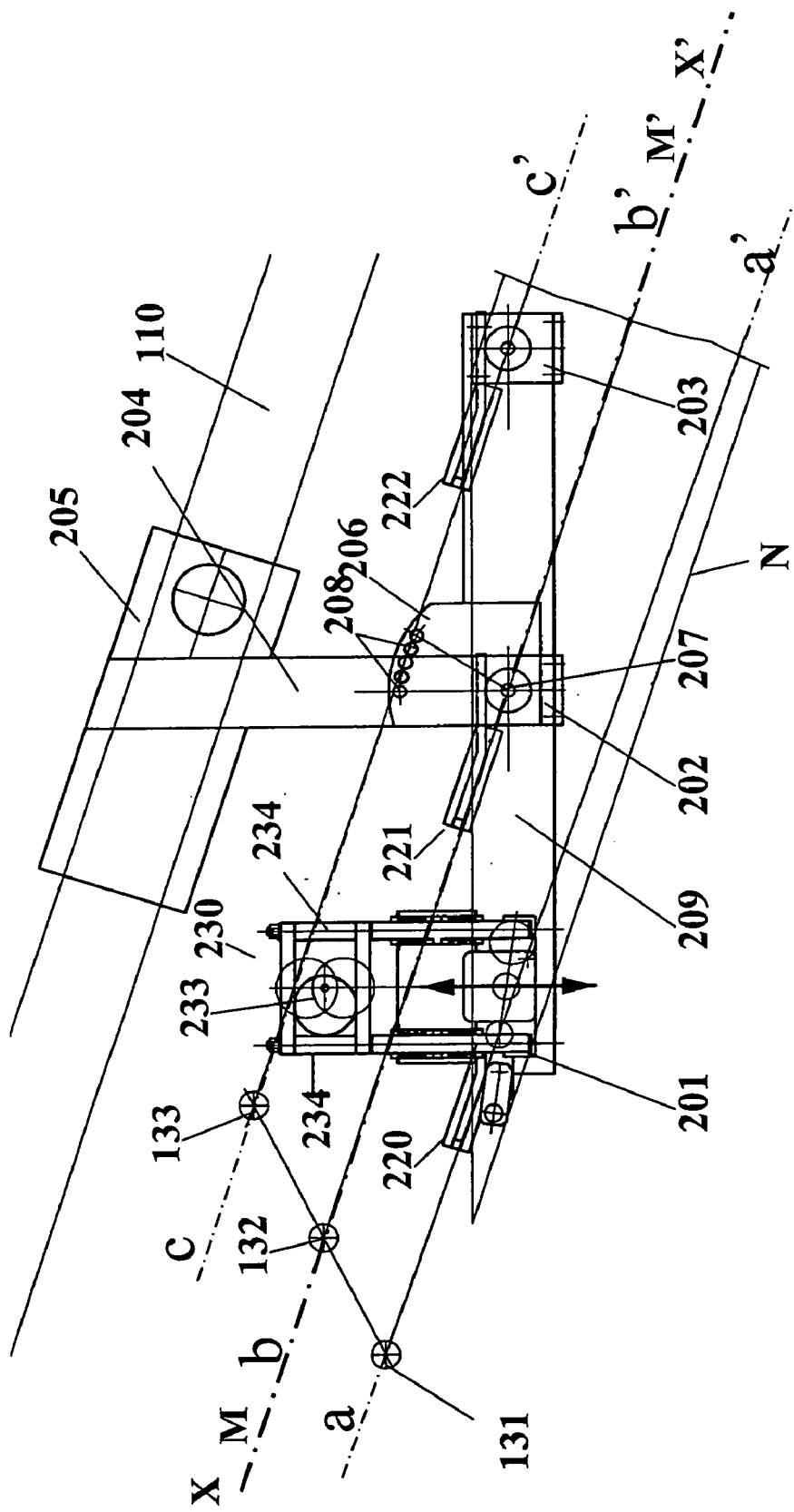
FIG. 7 depicts a general schematic plan view of a front transporter according to the invention.

FIG. 6A and FIG. 7 show respectively a partial front schematic view, a transverse section along A—A in FIG. 6 and a schematic plan view of a front transporter according to the method. An arm (204) is fixed by one of its ends to the motorised movable train (205) and through the other end supports a pivoting cross-member (209). An indexable fixing plate (206) fixes the cross-member (209) by its center to the arm (204). This fixing plate, fixed to the cross-member (209), comprises a central attachment point (207) disposed at the middle of the cross-member and a set of attachment points (208) predisposed so as to be able to fix the cross-member to the arm with an orientation substantially parallel to the edge of the ply and forming an angle ($\alpha$) with the machine axis (MM'), making it pivot about an axis (VV') perpendicular to the plane of the conveyer and passing through the center of the central attachment point (207).

The cross-member (209) supports two non-corrected gripping assemblies (202 and 203) and a gripping assembly (201) equipped with a ply edge corrector (230). These components can comprise one or more pneumatic suckers (210), (211) and (212, 213 and 214) or a magnet (215). Each gripping assembly is equipped with a raising and lowering cylinder (216, 217 and 218) for putting the suckers in contact with the top part of the ply. It will be noted that the gripping assembly (201) gripping the toe (1, 1') comprises several suckers (212, 213 and 214) as well as a magnet (215) falling or rising under the action of a pneumatic cylinder (219). This device grips the tapered part of the toe at several points so as to firmly hold this sector of the ply which would otherwise be liable to undergo significant movements.

By way of indication and for the purpose of simplifying the correction algorithms, they are designed so as to align the axis (VV') with the center of the sucker (211) and to make this axis pass through the machine axis (MM').

The gripping assembly (201) is equipped with a controllable ply edge corrector (230). Placed between the cross-member and the gripping assembly, this corrector is composed, as shown in FIG. 6A, of a positioning motor (231), a gearbox (232), an eccentric (233) and slides (234) making it possible, under the action of the motor and the eccentric, to move the gripping assembly (201) by a given correction value in a given direction which, in the case of the present description, is substantially perpendicular to the ply edge.

Reflectors (220, 221 and 222) are aligned with respect to the longitudinal axes respectively (aa', bb' and cc') passing through the center of the optical detectors respectively (131, 132 and 133). Still for the purpose of simplifying the algorithms it will be arranged to make the axis (bb') coincide with the machine axis (MM'). These reflectors, placed above the ply edge and longitudinally projecting towards the outside of the ply, enable the optical detectors to determine the passage of the ply edge precisely.

Figure 8:
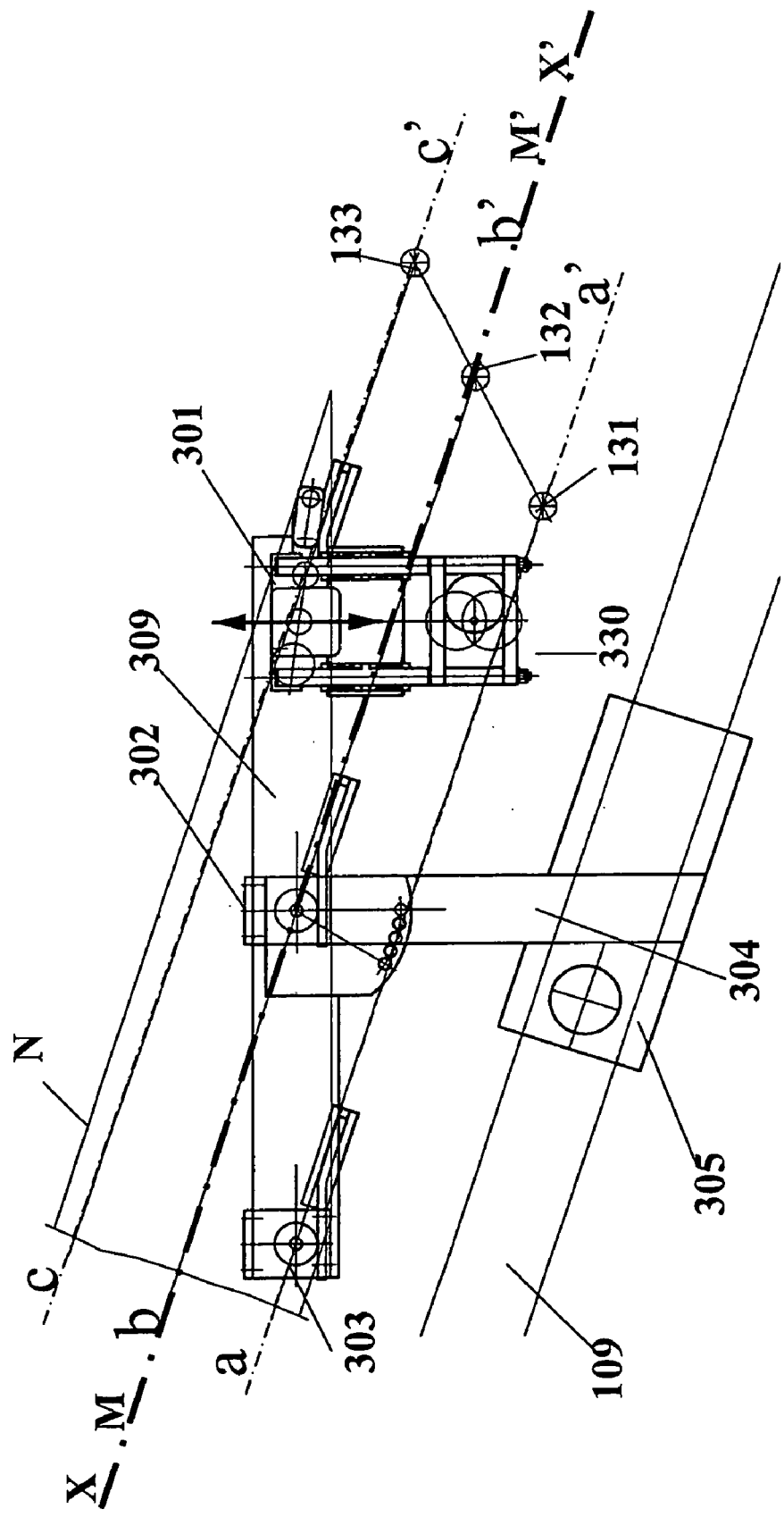
FIG. 8 depicts a general schematic plan view of a rear transporter according to the invention.

FIG. 8 depicts a schematic plan view of a rear transporter (300) in accordance with the invention. Similar to the front transporter (200), it comprises a pivoting cross-member (309) to which there are fixed two non-corrected gripping assemblies (302, 303) for gripping the rear central gripping sector (2') and the rear heel (3') as well as a gripping assembly (301) for the rear toe (1') comprising several suckers and a magnet, and equipped with a controllable ply edge corrector (330). An arm (304) connects the cross-member to the movable train (305).

This description, given non-limitingly, of a machine according to the method can be the subject of many arrangements for adapting the method to the type and size of plies to be manipulated. It is thus possible to increase the number of gripping assemblies, to equip the transporter with several gripping assemblies provided with a ply edge corrector, to vary the number and size of the suckers or magnets placed on the gripping assemblies, to have several detection lines available, to increase the number of detectors per detection line, and to position the detectors and gripping assemblies in different alignments.

One simplification of the construction of the transporter can consist for example of replacing the gripping assemblies not equipped with edge detectors and situated side by side with a bar equipped with a raising and lowering cylinder and comprising as many suckers or magnets as necessary, so as to simultaneously grip the gripping sectors which are to be held fixed during the edge alignment operation.

It is also possible to control the ply edge corrector by making it describe a transverse movement in a different direction, for example perpendicular to the boundary of the ply or to the bisector of the angle formed by the ply edge and the boundary. It is also possible to envisage causing the ply edge corrector to make a circular movement about a judiciously chosen axis perpendicular to the plane of the ply.

A person skilled in the art will easily be able to configure the automatic control device and the correction algorithms accordingly.

By way of illustration, the present description details a method in accordance with the invention using a machine as described previously and comprising a front transporter and a rear transporter each equipped with three gripping assemblies, where the gripping assemblies respectively gripping the front and rear toe are provided with an edge corrector.

This method comprises the following steps:

unwinding onto the conveyer (106) a continuous strip of belt (B) from the feed system (101), successively passing through the precentering system (112) and the autocentering system (107) so as to align the axis (XX') of the strip on the machine axis (MM'), cutting the belt strip by means of a cutting assembly (120) along a line parallel to the ply cords, so as to leave the front edge (4) clear, gripping the front area (A) by means of the gripping assemblies (201, 202 and 203) situated on the front transporter (200), unwinding a predetermined length (Li) of belt strip (B), and detecting the passage of the various front edge areas in line with the retro-reflecting laser cells (131, 132 and 133) situated in the detection line (130). By knowing the position of the cells and the lengths of ply unwound between the detection of the edges of each of the gripping sectors of the front area, it is possible to determine the angular geometry of the front edge (4) and in particular to estimate its curvature. Then, the method continues by gripping the rear area (A') by means of the gripping assemblies (301, 302 and 303) situated on the rear transporter (300), cutting the strip of belt along a line parallel to the ply cords so as to leave clear the rear edge (4') and obtain a belt ply (N), advancing the belt ply, determining the angular geometry of the rear edge (4') upon passing across the detection line, and aligning the front edge (4) and the rear edge (4') by moving respectively the front toe and the rear toe by means of the edge correctors (230 and 330) (disposed on the gripping systems) by respectively gripping the front toe (201) and the rear toe (301) while keeping fixed the gripping assemblies respectively gripping the front central gripping sector (202), the front heel (203), the rear central gripping sector (302) and the rear heel (303). The correction values are able to be calculated according to the difference between the angular geometries of the front and rear edges or according to the difference between the angular geometries measured for each of the front and rear edges and a predetermined reference angular value corresponding for example to the angle α. The method continues by bringing the laying form (104) closer by aligning the axis of the machine (MM') with the equatorial plane (EE') of the form, depositing the front area (A) on the laying form, winding the intermediate area (I) around the laying form, and depositing the rear area (A') on the laying form.

The depositing of the front area (A) on the laying form (104) is effected by successively applying and making adhere the parts of the ply corresponding to:

the front toe (1), the front central gripping sector (2) and the front heel (3), activating the magnetic or pneumatic device of the laying form making it possible to make the front area adhere to the surface of the form, and successively releasing the gripping assemblies (201, 202, 203) respectively gripping the front toe, the front central gripping sector and the front heel.

Likewise the depositing of the rear area (A') on the laying form (104) takes place by successively applying and making adhere the parts of the ply corresponding to: the rear heel (3'), the rear central gripping sector (2') and the rear toe (1'), activating the magnetic or pneumatic device of the laying form making it possible to make the rear area adhere to the surface of the form and successively releasing the gripping assemblies (303, 302, 301) respectively gripping the rear heel, the central gripping sector and the rear toe.

This method as has just been described allows all kinds of adaptations.

It is thus possible to correct the length of the layer by assessing the distance between the edge of the front toe and the edge of the rear heel, the distance between the edge of the front central gripping sector and the edge of the rear central gripping sector, and the distance between the edge of the front heel and the edge of the rear toe and comparing them with a predetermined reference length. The adjustment of the length of the ply can take place either by longitudinally moving in opposite directions the two transporters (200 and 300) by the required correction values, or by modifying in a ratio calculated for this purpose the synchronisation of the advance of the conveyer and transporter with respect to the rotation of the laying form.

Nevertheless, one of the substantial advantages of the method is the laying of a belt ply on a form having a curved crown (G), convex or concave, as shown diagrammatically in FIGS. 10 and 11. The form with a convex curve, FIG. 10, is characterised by a small diameter (D1) at the edges and a large diameter (D2) at the equator. The form with a concave curve, FIG. 11, is characterised by a large diameter at the edges (D2) and a small diameter (D1) at the equator.

These two configurations make it necessary to compensate for some of the differences between the large and small diameters. To obtain this result, an unwound length of the belt ply (L1) is determined close to the smallest circumference (π×D1) and, by longitudinally moving the transporters in opposite directions, the ply is stretched so as to bring its length to a judiciously chosen value (L2), such that the ratio k=L2/L1 is between 1 and D2/D1. This coefficient k is determined experimentally according to the nature of the fabric and the magnitude of the curve. The ply edges are then aligned by adding to the correction values determined by the analysis of the angular geometries measured for each of the front and rear edges a predetermined value for compensating for the angular variations introduced by the curve and the tensioning of the ply.

It is also possible to envisage the laying of a ply whose edge forms an angle (α) with the longitudinal direction greater than 65° and able to range up to 90°. For the latter value, generally corresponding to a reinforcement ply intended for producing a radial carcass tire, the gripping assemblies equipped with an edge detector will be disposed preferentially at the diagonally opposite corners of the ply. For more information on controlling the radiality of the edges it is possible to equip with an edge corrector the gripping assemblies gripping the sectors situated at the edge of the boundaries of the ply. The calculation of the correction values is assisted accordingly.

Another adaptation consists of effecting the correction movement of the toe by releasing one or more gripping assemblies gripping the gripping sectors situated between the toe and the heel, whilst keeping the gripping assembly gripping the heel fixed.

It may also prove practical to implement the method using a single transporter. This transporter may as required:

comprise two gripping assemblies equipped with a ply edge corrector and respectively gripping the toe and the heel, and a non-corrected gripping assembly gripping the central gripping sector, or be provided with a cross-member pivoting through 180° about its central axis (VV'), the same gripping assemblies equipped or not with an edge corrector then being able to successively grip the symmetrical sectors similar to the front area and rear area.

Under these conditions the laying cycle is adapted as follows:

unwinding a continuous belt strip (B), on a conveyer (106) from a feed system (101), cutting the belt strip (B) along a line parallel to the ply cords, so as to leave the front edge (4) clear, gripping the front area (A), by means of the gripping assemblies situated on the transporter, unwinding the belt strip, determining the angular geometry of the front edge (4) on passing across a fixed detection line (130), aligning the front edge (4), bringing the laying form (104) closer, depositing the front area (A) on the laying form, continuing the unwinding of the belt strip (B) until a predetermined ply length (L1) is obtained, whilst continuing to wind up the intermediate area (I) around the laying form, gripping the rear area (A') by means of the gripping assemblies situated on the transporter, cutting the belt strip (B) along a line parallel to the ply threads so as to leave clear the rear edge (4') and obtain a belt ply (N), advancing the belt ply whilst continuing to wind up the intermediate area (I) around the laying form, determining the angular geometry of the rear edge (4') on passing across the fixed detection line, aligning the rear edge (4'), finishing winding up the intermediate area (I) around the laying form, depositing the rear area (A') on the laying form.

Another arrangement of the method consists of interposing a magnetic belt with a length at least equal to the length of the belt ply, between the laying form and the conveyer. This device proves advantageous for improving the cycle time in the case where only a single transporter is available. After having made the corrections of the front edge and rear edge, the transporter deposits the belt ply on the magnetic belt. At the required cycle time, the belt is deposited and wound around the form.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed is:

1. In a method of laying a tire belt ply on a generally cylindrical form, the ply comprising a front area, a rear area, and an intermediate area, the front and rear areas being bordered by respective front and rear edges, the improvement comprising the steps of:
  A. providing movable front and rear transporters, each transporter carrying a toe gripping assembly, a central sector gripping assembly and a heel gripping assembly of which only the toe gripping assemblies are provided with respective front and rear ply edge correctors;
  B. causing the gripping assemblies of the front transporter to grip respectively a toe, a central gripping sector, and a heel of the ply's front area, and causing the gripping assemblies of the rear transporter to grip respectively a toe, a central gripping sector, and a heel of the ply's rear area;
  C. moving the front and rear transporters so that the front and rear edges of the ply pass across a fixed detector line for measuring angular geometries of the front and rear edges and determining therefrom a correction value for the front and rear edges; and
  D. aligning the front and rear edges by activating the front ply edge corrector and the rear ply edge corrector to move the toes of the ply's front and rear edges, respectively, in accordance with the correction value, while keeping fixed the central sector and the heel of each of the front and rear edges.

2. In a method according to claim 1, wherein each correction value is determined according to a difference between the angular geometries of the front and rear edges.

3. In a method according to claim 1, wherein the correction value is determined according to a difference between the angular geometries measured for each of the front and rear edges and a predetermined reference angular value.

4. In a method according to claim 1, further comprising the following steps:
  unwinding onto a conveyer a continuous strip of belt from a feed system,
  cutting the belt strip along a line parallel to ply cords of the belt, so as to leave the front edge clear, gripping the front area by means of the gripping assemblies situated on the front transporter,
  unwinding a predetermined length of belt strip,
  determining the angular geometry of the front edge upon passing across the fixed detection line,
  gripping the rear area by means of the gripping assemblies situated on the rear transporter,
  cutting the strip of belt along a line parallel to the ply cords so as to leave clear the rear edge and obtain a belt ply,
  advancing the belt ply by advancing the conveyor and the front and rear transporters simultaneously,
  determining the angular geometry of the rear edge upon passing across the detection line,
  aligning the front edge and the rear edge,
  bringing the laying form closer,
  depositing the front area on the laying form,
  winding the intermediate area around the laying form, and
  depositing the rear area on the laying form.

5. In a method according to claim 4, wherein the advancements of the conveyer and transporters are respectively synchronized with the rotation of the laying form.

6. In a method according to claim 4, in which the length of the ply is adjusted by moving the two transporters longitudinally and in respective opposite directions by the required correction values.

7. In a method according to claim 4, wherein the length of the ply is adjusted by modifying, in a given ratio, the synchronization of the advance of the conveyer and transporters with respect to the rotation of the laying form.

8. In a method according to claim 1, wherein the laying form has a curved crown having a large diameter and a small diameter, further comprising the following steps:
  unwinding and cutting the belt strip in order to obtain a ply of predetermined length (L1) close to a smallest circumference ($\pi \times D1$), putting the ply under tension by stretching to a length (L2) such that the ratio $k=L2/L1$ is between 1 and D2/D1, and
  effecting the alignment of the ply edges by adding to the correction values determined by the analysis of the angular geometries measured for each of the front and rear edges a predetermined value for compensating for the angular variations introduced by the curve and the tensioning of the ply.

* * * * *